(12) United States Patent
Dunietz et al.

(10) Patent No.: US 7,814,408 B1
(45) Date of Patent: Oct. 12, 2010

(54) PRE-COMPUTING AND ENCODING TECHNIQUES FOR AN ELECTRONIC DOCUMENT TO IMPROVE RUN-TIME PROCESSING

(75) Inventors: Jerry Dunietz, Seattle, WA (US); Nathan Lewis, Redmond, WA (US); Jason Hills, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 708 days.

(21) Appl. No.: 09/552,262

(22) Filed: Apr. 19, 2000

(51) Int. Cl.
*G06F 17/00* (2006.01)
*G06F 17/30* (2006.01)

(52) U.S. Cl. .................. 715/234; 715/205; 715/239; 715/271

(58) Field of Classification Search ............... 715/513, 715/501.1, 514, 205, 207, 208, 234, 239, 715/242, 255, 271
See application file for complete search history.

(56) References Cited

U.S. PATENT DOCUMENTS

| | | | | |
|---|---|---|---|---|
| 4,864,502 A | * | 9/1989 | Kucera et al. ................ | 704/8 |
| 5,228,121 A | * | 7/1993 | Fontaine et al. ............. | 715/531 |
| 5,524,201 A | | 6/1996 | Shwarts et al. | |
| 5,745,745 A | * | 4/1998 | Tada et al. ................... | 707/1 |
| 5,956,034 A | | 9/1999 | Sachs et al. | |
| 5,978,818 A | | 11/1999 | Lin | |
| 5,987,482 A | | 11/1999 | Bates et al. | |
| 6,035,268 A | * | 3/2000 | Carus et al. .................. | 704/9 |
| 6,055,544 A | * | 4/2000 | DeRose et al. ............. | 707/104.1 |
| 6,128,633 A | | 10/2000 | Michelman et al. | |
| 6,175,845 B1 | | 1/2001 | Smith et al. | |
| 6,177,936 B1 | | 1/2001 | Cragun ....................... | 345/760 |
| 6,278,992 B1 | | 8/2001 | Curtis et al. ................. | 707/3 |
| 6,330,574 B1 | * | 12/2001 | Murashita ................... | 715/513 |
| 6,331,867 B1 | | 12/2001 | Eberhard et al. ............ | 345/864 |
| 6,370,553 B1 | * | 4/2002 | Edwards et al. ............. | 715/514 |
| 6,424,982 B1 | | 7/2002 | Vogel .......................... | 715/531 |

(Continued)

FOREIGN PATENT DOCUMENTS

EP    0924629 A2    6/1999

(Continued)

OTHER PUBLICATIONS

"Open eBook Publication Structure 1.0", [http://www.openebook.org/oebps/oebps1.0/index.htm], published Sep. 16, 1999, pp. 47.*

(Continued)

*Primary Examiner*—Adam L Basehoar
(74) *Attorney, Agent, or Firm*—Workman Nydegger

(57) ABSTRACT

A markup language document, such as an e-book, having a general format is converted into a simplified hierarchy of linked files. During this process, the file is pre-computed and encoded to accelerate run-time search operations and to minimize the computational requirements for run-time parsing and other forms of processing. The resulting e-book content is organized in a simplified file format hierarchy. The e-book file format hierarchy includes a root directory containing all of the files for a particular e-book. The root directory contains a content subdirectory linked to the root directory. The content subdirectory has nested therein at least one linked content file providing content information relating to the electronic book. The content file is pre-computed and encoded to minimize run-time processing.

13 Claims, 8 Drawing Sheets

U.S. PATENT DOCUMENTS

| | | | |
|---|---|---|---|
| 6,442,576 B1 * | 8/2002 | Edelman et al. | 715/513 |
| 6,493,734 B1 | 12/2002 | Sachs et al. | 715/526 |
| 6,546,406 B1 * | 4/2003 | DeRose et al. | 715/513 |
| 6,581,062 B1 * | 6/2003 | Draper et al. | 707/100 |
| 6,604,106 B1 * | 8/2003 | Bodin et al. | 707/101 |
| 6,859,805 B1 | 2/2005 | Rogers | |
| 2006/0031764 A1 | 2/2006 | Keyser | |
| 2006/0150096 A1 | 7/2006 | Thacker | |

FOREIGN PATENT DOCUMENTS

| | | |
|---|---|---|
| WO | WO 97/10541 | 3/1997 |
| WO | WO 00/23911 | 4/2000 |
| WO | WO 00/63784 | 10/2000 |
| WO | WO 01/29635 A2 | 4/2001 |

OTHER PUBLICATIONS

W3C, "HTML 4.01 Specification—Section 7", Dec. 24, 1999, pp. 1-22.*

NuvoMedia Inc., Rocket eBook information retrieved from the website www.rocketbook.com/Products/index.html Oct. 14, 1999.

NuvoMedia Inc., Rocket eBook information retrieved from the website www.rocketbook.com/Products/Tour/index.html Oct. 14, 1999.

NuvoMedia Inc., Rocket eBook information retrieved from the website www.rocketbook.com/Products/Faq/technical.html Oct. 14, 1999.

NuvoMedia Inc., Rocket eBook information retrieved from the website www.rocketbook.com/Products/Faq/standards.html Oct. 14, 1999.

NuvoMedia, Inc., Rocket eBook information retrieved from the website www.rocketbook.com/Products/Faq/using.html Oct. 14, 1999.

Softbook Press, Inc., Softbook Reader Information retrieved from website www.softbook.com/consumer/reader.asp Oct. 14, 1999.

Automatic Reformat Propagation, IBM Technical Disclosure Bulletin, vol. 29, No. 10, p. 4682 Mar. 1997.

Adam, T., et al., Document Pagination, IBM Technical Disclosure Bulletin, vol. 24, No. 9, p. 4579 Feb. 1982.

International Search Report (6 pages).

Miyzawa M. et al., Institution of Electrical Engineers, INSPEC/IEE, Stevenage, Great Britain (1990) Database Accession No. AN 3986160, XP002180891—abstract (1 page).

PCT International Search Report (7 pages).

Open eBook™ Publication Structure 1.0 dated Sep. 16, 1999.

* cited by examiner

ALICE IN WONDERLAND

Lewis Carol

Annotations Index    First Page
                     Most Recent Page
                     Furthest Read

ALICE IN WONDERLAND
Lewis Carol

Chapter II: The Pool of Tears

"Curiouser and curiouser!" cried Alice (she was so much surprised, that for the moment she quite forgot how to speak good English); "now I'm opening out like the largest telescope that ever was! Good-bye, feet!" (for when she looked down at her feet, they seemed to be almost out of sight, they were getting so far off). "Oh, my poor little feet, I wonder who will put on your shoes and stockings for you now, dears? I'm sure I shan't be able! I shall be a great deal too far off to trouble myself about you: you must manage the best way you can;—but I must be kind to them," thought Alice, "or perhaps they won't walk the way I want to go! Let me see: I'll give them a new pair of boots every Christmas."And she went on planning to herself how she would manage it. "They must go by the

PRE-COMPUTING AND ENCODING TECHNIQUES FOR AN ELECTRONIC DOCUMENT TO IMPROVE RUN-TIME PROCESSING

This patent application is related to the following patent applications filed herewith:

(1) U.S. patent application Ser. No. 09/552,001, now abandoned, entitled "Method and Apparatus for Pre-Processing Link Destinations from within an Electronic Document," filed on Apr. 19, 2000, and having named inventors Jerry Dunietz and Nathan Lewis; and (2) U.S. patent application Ser. No. 09/552,230, now U.S. Pat. No. 6,789,229, entitled "Document Pagination Based on Hard-Breaks and Active Formatting Tags," filed on Apr. 19, 2000, and having named inventors Jerry Dunietz and Jason Hills.

BACKGROUND OF THE INVENTION

1. Technical Field

The present invention relates to the display of electronic documents and, in particular, to a technique for pre-computing and encoding an electronic document to minimize run-time computational requirements for parsing and search operations.

2. Related Information

For many years, the printed-paper book has been the mechanism by which individuals read books and other print media. Today, however, individuals can read books and other written publications using electronic reading devices. These reading devices have viewing screens where the user may view electronic text and graphics. These devices may be hand-held devices or may be traditional computing devices such as personal computers. Examples of such devices are the "ROCKET EBOOK" device by NuvoMedia, Inc. and the "SOFTBOOK READER" device by Softbook Press, Inc. Application programs running on these reading devices may be used to read electronic publications. These programs will soon include, for example, the "READER" brand viewing program, published by Microsoft Corporation of Redmond, Wash. The electronic publications for use with reading devices are commonly referred to electronic books or "e-books".

E-book content is typically in the form of a markup language format, such as HyperText Markup Language (HTML) or eXtensible Markup Language (XML).

Other forms of mark-up languages used today include, for example, Standard Generalized Markup Language (SGML), eXtensible HyperText Markup Language (XHTML), and Synchronized Multimedia Integration Language (SMIL). As another example, e-books may be formatted in a general format in accordance with an Open eBook standard. This standard is set forth in Open eBook Publication Structure 1.0, which can be found at www.openebook.org. This publication is incorporated herein by reference in its entirety. These markup languages allow e-books to have added functionality over other traditional formats, including, for example, providing links to jump to another document or performing a specified function.

Although the markup language is useful and necessary for displaying the e-book on a reading device, it also has its limitations. In particular, the markup language significantly increases the computational burden for various run-time processes such as parsing. When the markup language document is displayed, tags within the document must be processed to display the document in accordance with the parameters set by the tags. Tags are generally commands written between less than (<) and greater than (>) signs. Typically, an opening tag and a closing tag surround a piece of text. Attributes may also be placed within the tag, namely between the less than and greater than signs, to provided added functionality. These tags are heavily intermixed with content. This results in substantial run-time computational work to parse markup language documents to distinguish tags from content. Moreover, these tags are non-integer variables within the markup language document. Accordingly, during run-time, these tags require additional processing to identify the function to be achieved for each tag.

The markup language also increases the computational burden for run-time search operations. For example, in markup language documents, tags may be placed between syllables within a word to provide added functionality; others are placed between words. During run-time searching, therefore, additional processing is required to determine which of these tags are word separators. As another example, markup language documents may include content that is not to be displayed. During run-time searching, it is computationally wasteful to search such content. As yet another example, the markup language document may include Uniform Resource Locator (URL) references. These references, however, must be processed at run-time to determine the location of the document identified by the URL. In the case where the URL references its own document or where the URL references a document residing locally, significant run-time processing must typically be performed to locate the referenced document.

Unfortunately, the required run-time processing to perform any of the above functions, especially for larger e-books, can be highly time-consuming. The process is likely to be unacceptably slow for larger e-book files. This slow processing is often exacerbated when coupled with a reading device having a slow processor. It is therefore desirable to provide a technique to reduce computational requirements for run-time parsing and other forms of processing.

SUMMARY OF THE INVENTION

The present invention solves many of the aforementioned problems by converting the e-book, using a conversion tool, from a general format, such as the Open eBook format, to a simplified file format hierarchy. In the process, the conversion tool pre-computes and encodes the e-book to accelerate run-time search operations and to minimize computation requirements for run-time parsing and other forms of processing. In a preferred embodiment, the converted e-book file format hierarchy includes a root directory containing all of the files for a particular e-book. The root directory contains a content subdirectory linked to the root directory. The content subdirectory has nested therein at least one linked content file providing content information relating to the electronic book. The content file is pre-computed and encoded to minimize run-time processing. Also included in the hierarchy are other files including a metadata file, a manifest file, a page-break index, and/or one or more link destination indeces.

The simplified file format resulting from the encoding process minimizes the computational requirements for run-time parsing and other forms of processing. Under the encoding process, the tags and the content of the e-book file are first separated. The tags are then encoded with pre-defined integer representations or aliases of the tags. Next, pre-computed flags, used to accelerate linear searching, are inserted. The resulting file is then encoded with UTF-8 encoding to form an encoded sequence of bytes. The encoded data is then provided to a compression agent, which is ignorant of the semantics of the file, to form a compressed sequence of bytes.

The simplified file format resulting from the pre-computing process accelerates run-time search operations. The e-book file is pre-computed and flags are inserted in the tags to identify start and end tags, to properly identify word breaks, to identify areas of content that should be skipped during a run-time search operation, and to identify locations for embedded URL references.

By using the pre-computing and encoding techniques of the present invention, computational simplicity and extensibility can be achieved. In addition, large e-book files may be efficiently stored within a reading device. These as well as other novel advantages, details, embodiments, features and objects of the present invention will be apparent to those skilled in the art from following the detailed description of the invention, the attached claims and accompanying drawings, listed herein, which are useful in explaining the invention.

BRIEF DESCRIPTION OF THE DRAWINGS

In the following text and drawings, wherein similar reference numerals denote similar elements throughout the several views thereof, the present invention is explained with reference to illustrative embodiments, in which:

FIG. 6 depicts a cover page of one of the e-books of FIG. 5;

FIG. 8 depicts the first page of the second chapter of the e-book of FIG. 6.

DETAILED DESCRIPTION OF THE PREFERRED EMBODIMENTS

The present invention discloses a process for pre-computing and encoding electronic documents to minimize computational requirements for run-time parsing, search operations, and other forms of processing. The document is converted using a conversion tool and the resulting content is organized in a file format hierarchy that may be used with electronic reading devices. Documents generally include electronic representations of any publication, including but not limited to, books, periodicals, reference materials, newspapers, etc. Such documents utilize markup language functionality to embed tags or links within the document.

Although not required, the invention will be described in the general context of computer-executable instructions, such as program modules. Generally, program modules include routines, programs, objects, scripts, components, data structures, etc. that perform particular tasks or implement particular abstract data types.

Figure 1:
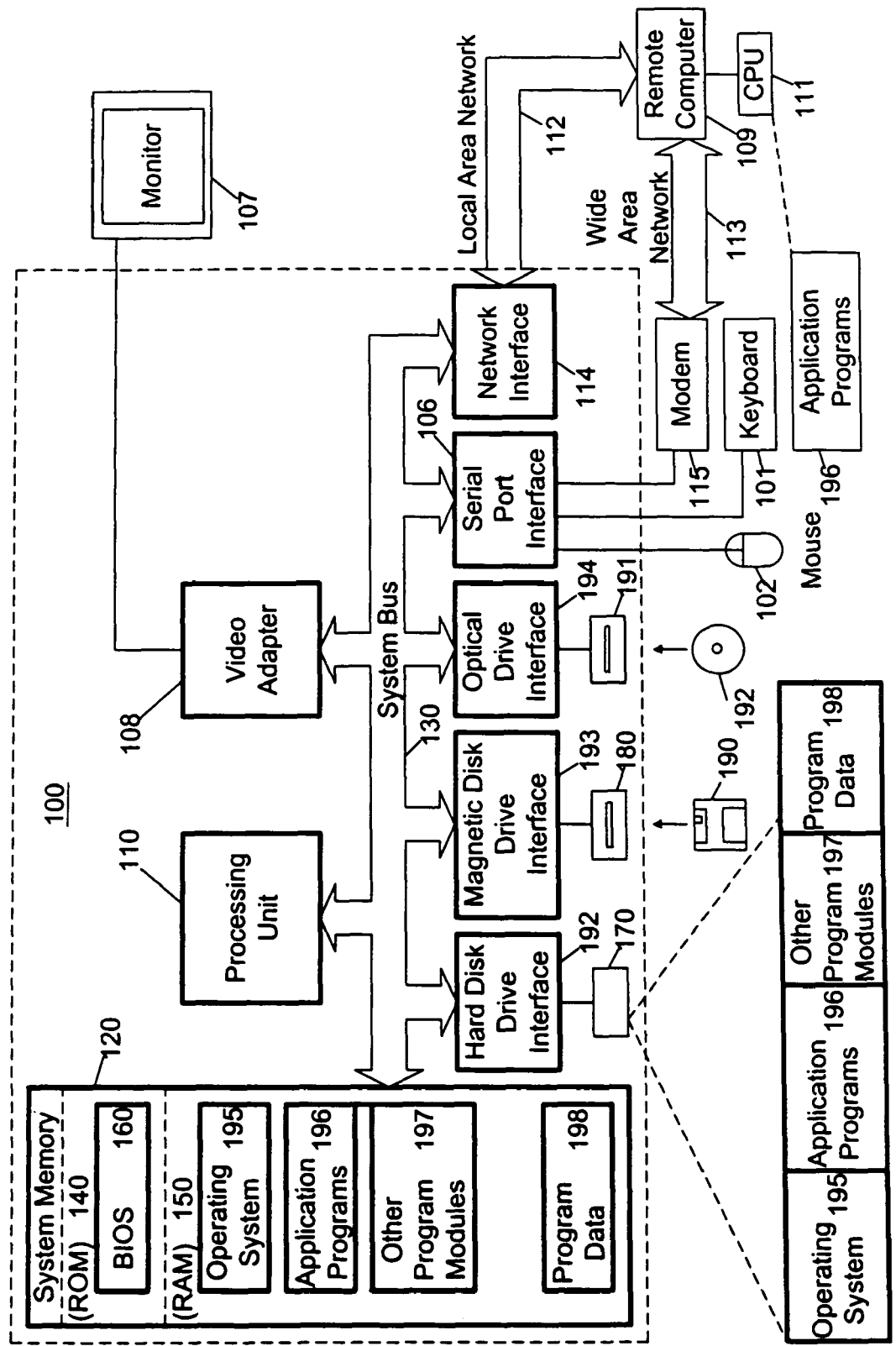
FIG. 1 is a schematic block diagram of a computer for use with the present invention.
Figure 5:
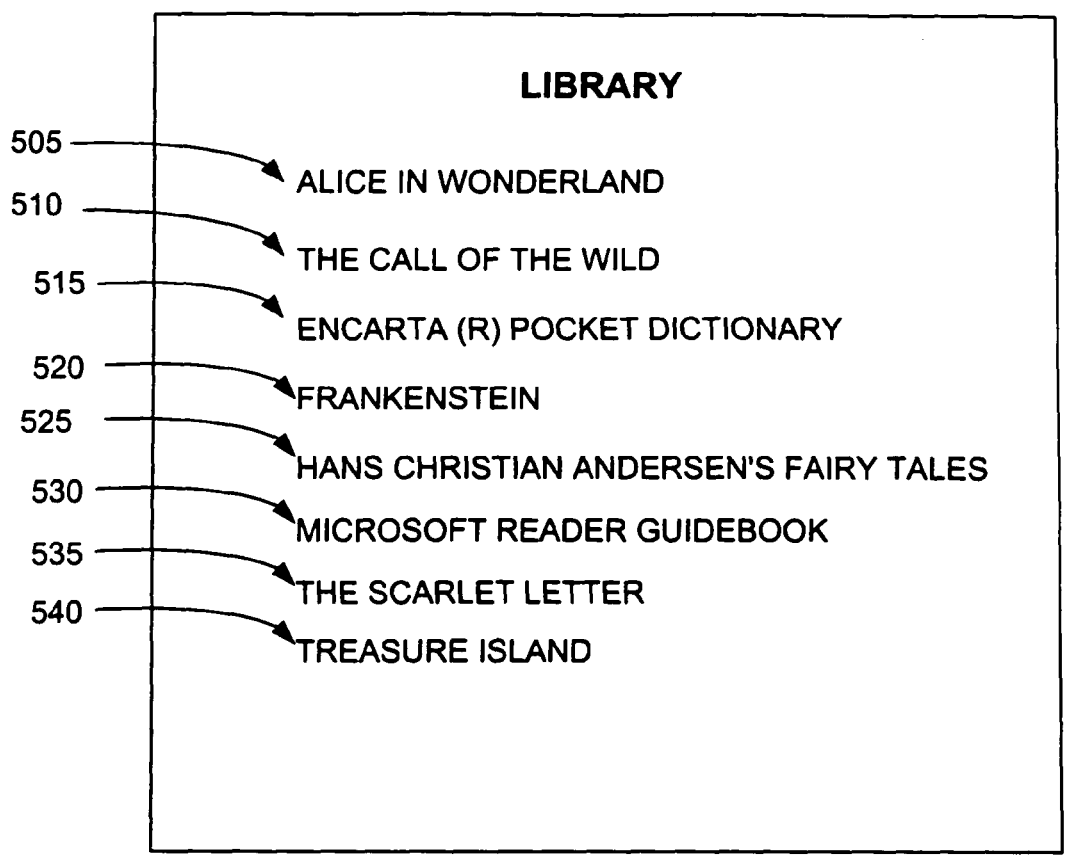
FIG. 5 depicts a screen of an application program for reading e-books showing the various e-books contained therein.
Figure 7:
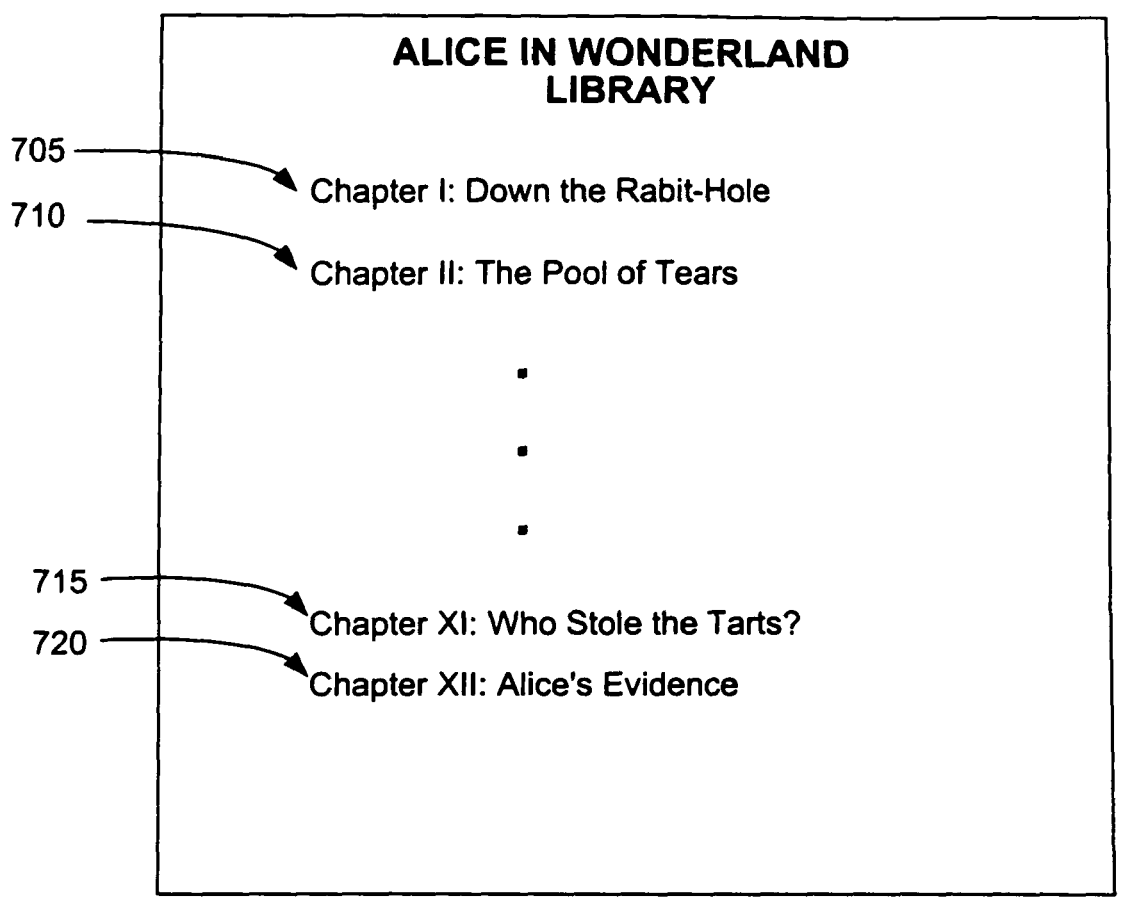
FIG. 7 depicts the first page of the e-book of FIG. 6.

In a preferred embodiment, the document is an electronic book or an e-book. A reading device 235 (of FIG. 2) is used to display the e-book to a user. Reading devices are generally known in the art and may be separate hand-held computing devices or may be general computing devices such as personal computers (FIG. 1). The reading devices run an application program to view the e-books. Such application programs will soon include, for example, the "READER" brand viewing program, published by Microsoft Corporation of Redmond, Wash. FIG. 5 depicts a screen of the "READER" application program showing the various e-books contained therein and FIGS. 6-8 depicting various pages of one of the e-books. FIG. 6 depicts a cover page 600 of one of the e-books. FIG. 7 depicts the first page 700 of the e-book showing a table of contents. This page can be access by linking to it from the cover page or by hitting a page down key. The various chapters of the book are links 705-720 such that when selected, the reading device will jump to the designated chapter of the e-book. FIG. 8 depicts the first page 800 of the second chapter of the e-book of FIG. 7. Again, this page may be accessed by linking to if from the first page (link 710 depicted in FIG. 7). Although a preferred embodiment of the present invention is used with e-books, the present invention may be utilized with any electronic document having contained therein markup language.

FIG. 1 is a schematic block diagram depicting a reading device as a personal computing device. The reading device 235 may also be a simplified version of personal computer 100. The reading device 235 may be a separate hand-held computing device or may be an application for use with a more general computing device such as a personal computer. The reading device 235 may also be part of a multiprocessor system, a microprocessor-based or programmable consumer electronic device, a network PC, a minicomputer, a mainframe computer, and the like. Hand-held devices available today include Pocket-PC devices manufactured by Compaq, Hewlett-Packard, Casio, and others.

The personal computing device is typically a general-purpose computing device in the form of a conventional personal computer 100, including a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory includes read only memory (ROM) 140 and random access memory (RAM) 150.

A basic input/output system 160 (BIOS), containing the basic routines that help to transfer information between elements within the personal computer 100, such as during start-up, is stored in ROM 140. The personal computer 100 further includes a hard disk drive 170 for reading from and writing to a hard disk, not shown, a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100.

Although the exemplary environment described herein employs a hard disk, a removable magnetic disk 190 and a removable optical disk 192, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment. It is anticipated that a handheld device implementing this invention would typically have only one mass-storage peripheral, either a micro hard disk or else flash memory or equivalent.

A number of program modules may be stored on the hard disk, magnetic disk 190, optical disk 192, ROM 140 or RAM 150, including an operating system 195, one or more application programs 196, other program modules 197, and program data 198. A user may enter commands and information into the personal computer 100 through input devices such as a keyboard 101 and pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, game port or a universal serial bus (USB). A monitor 107 or other type of display device is also connected to the system bus 130 via an interface, such as a video adapter 108. In addition to the monitor, personal computers typically include other peripheral output devices (not shown), such as speakers and printers. Preferably, any implementation of the present invention is designed to be operable in a least case scenario only by touch, and does not always require the use of a keyboard or mouse.

The personal computer 100 may operate in a networked environment using logical connections to one or more remote computers, such as a remote computer 109. The remote computer 109 may be another personal computer, a server, a router, a network PC, a peer device or other common network node, and typically includes many or all of the elements described above relative to the personal computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet. It is anticipated that a handheld device used to implement the present invention would typically use a wireless LAN interface based on an infrared or radio frequency communication link.

When used in a LAN networking environment, the personal computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device. It will be appreciated that the network connections shown are exemplary and other means of establishing a communications link between the computers may be used.

Those skilled in the art will appreciate that the invention may be practiced with any number of computer system configurations including, but not limited to, distributed computing environments where tasks are performed by remote processing devices that are linked through a communications network. In a distributed computing environment, program modules may be located in both local and remote memory storage devices.

Figure 2:
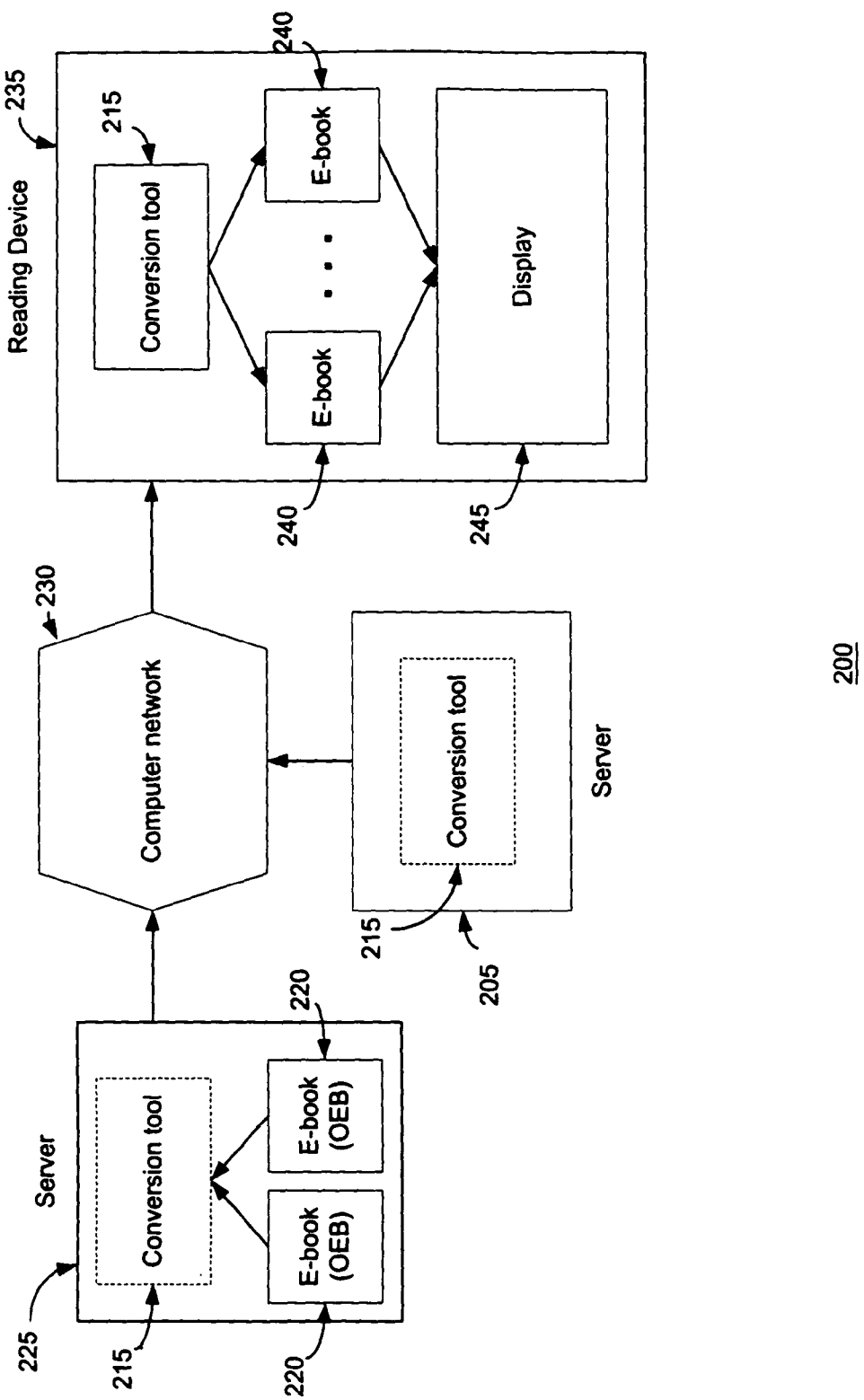
FIG. 2 is a schematic block diagram of a network of computers for converting and storing e-books.
Figure 3:
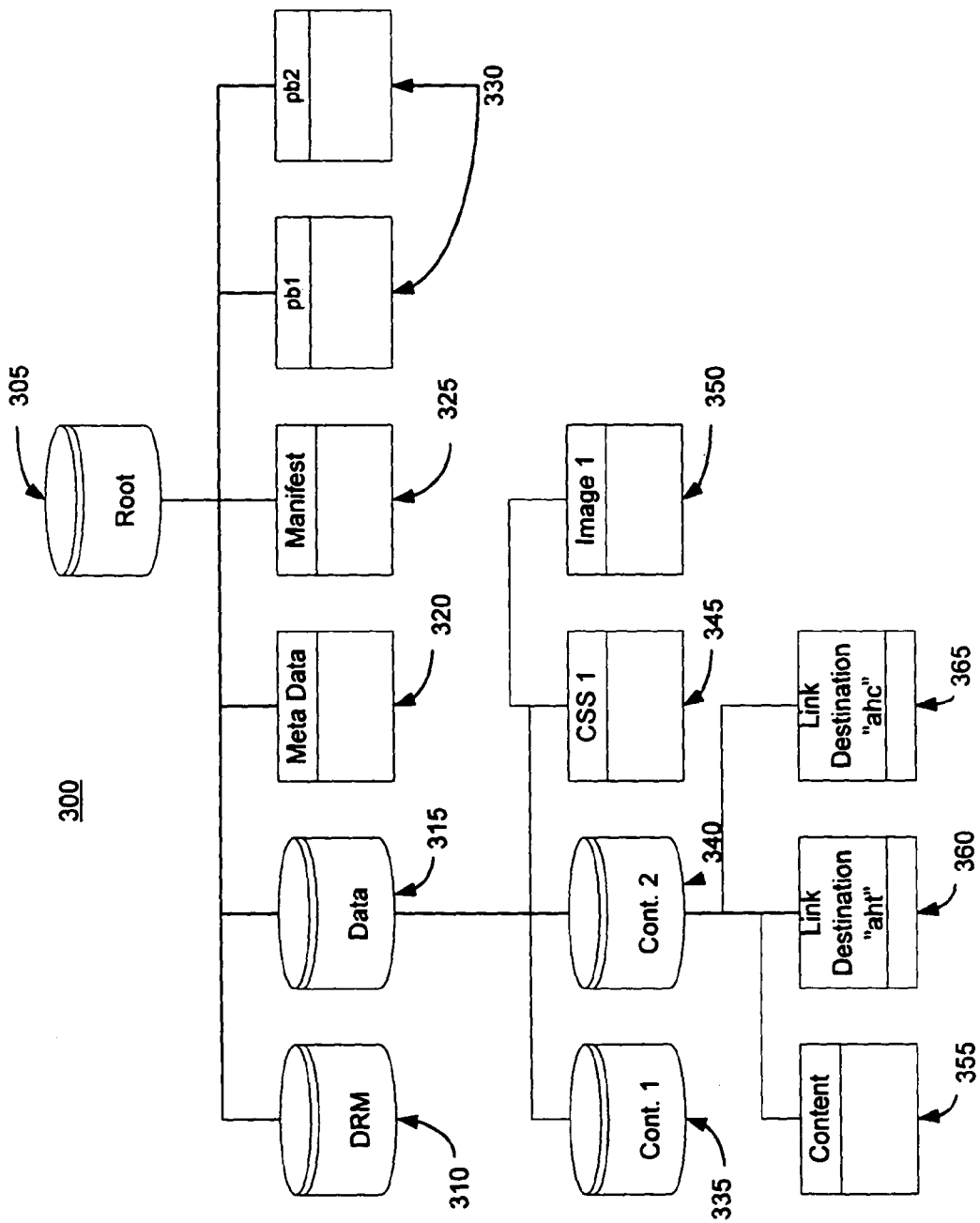
FIG. 3 is a schematic block diagram of a file format hierarchy of an e-book in accordance with a preferred embodiment of the present invention.

FIG. 2 is a schematic block diagram of a network of computers 200 providing access to e-books. The network generally includes a computer network 230 such as the Internet, a client side such as the reading device 235, and servers 225 and 205. The reading device 235 includes one or more e-books 240 stored locally in memory. The user may select one of these e-books 240 for viewing via a display screen 245. The user may also access other e-books stored externally at a server 225 over the computer network 230. Also included in servers 225 and 205 may be a conversion tool 215, namely a program to pre-compute and encode the e-book in accordance with the present invention (discussed herein). E-books are commonly developed or authored using a general format including, for example, the Open E-book or OEB format and stored in an uncoded form 220. Accordingly, the conversion tool 215 also serves to convert the uncoded e-book 220 into an encoded e-book 240 having a nested hierarchy of files as depicted in FIG. 3. The conversion tool 215 may also be implemented within the reading device 235, or any other location within the computer network 200 such as a server 225 having stored therein one or more encoded e-books 220, or a server 205 for converting e-books. Accordingly, the reading device 235 may convert the e-book during the download process, or the e-book may already be converted before it is received by the reading device 235.

As stated, the converted e-book 240 has a nested hierarchy of files. This hierarchy is illustrated in FIG. 3 in accordance with a preferred embodiment. Each e-book is contained within a single file 300. For example, the e-books 505-540 listed in FIG. 5 are represented by eight e-book files, one for each of the e-books 505-540 listed by the reading software. Referring back to FIG. 3, each e-book file is preferably a form of a compound storage file such that it may hold multiple directories and files in a single file. In one embodiment, the directories and files may be OLE IStorages and IStreams, respectively, using the OLE object model. In an alternative embodiment, the e-book may be represented by a plurality of files that are linked together.

Referring still to FIG. 3, the resulting e-book file has a root directory 305. The root directory 305 is stamped with a unique identifying code or CLSID such that the electronic reading device will open only those e-book files that include the unique CLSID. Alternatively, the device may be configured to read other file formats including those having other CLSIDs.

The root directory 305 contains a linked metadata file 320 and a linked content subdirectory 315. The metadata file 320 contains information about the e-book publication as a whole (e.g., author, language, etc.). Particulars of the metadata file 320 are discussed in further detail below. The content subdirectory 315 is a child directory of the root directory 305. The content subdirectory 315 has nested within it subdirectories that themselves contain the content files 335-350 of the e-book (e.g., extensible Markup Language (XML), Standard Generalized Markup Language (SGML), HyperText Markup Language (HTML), Cascading Style Sheets (CSS) and/or image files). Metadata file 320 references files that are nested within the content subdirectory 315. It should be appreciated the elements shown in FIG. 3 are merely illustrative and that any number of files may be nested within content subdirectory 315.

E-book material is represented by the content subdirectory 315, which itself contains multiple files. The content subdirectory 315 is intended as the root of a mini-"file system"

which can contain an arbitrary hierarchy of content files 335-350 representing the e-book. Optionally, the content files 335-350 may be organized with additional levels of nested subdirectories between the content subdirectory 315 and the content files 335-350. However, as shown in FIG. 3, the content files 335-350 for the e-book are embedded in subdirectories of the content subdirectory 315.

Image files 350 are stored as separate files for each image, with the name of each image file 350 preferably being exactly the identifier of the file from which the image was extracted, as specified in the metadata file. This identifier may or may not match the original image filename. For example, there may exist a file called "cover.img" containing the bytes of a Joint Photographic Experts Group (JPEG) image that were originally stored, at authoring time, in a file called "cover.jpg". In this example, this image may have been referenced by the metadata file 320. As another example, there may be a file called "image1.jpg" which was referenced by an <IMG> tag in the contents of the publication.

Content subdirectory 315 also may contain one or more linked Cascading Style Sheets (CSS) files 345. CSS is a language used to gain greater control over the display of text and elements in structured content, such as HTML or XML content.Multiple style sheets can be applied to the same HTML file. The CSS files 345 correspond to external stylesheets in the original content, and typically contain raw copies of the original files. CSS data can also be embedded within content documents.

The "Content 2" subdirectory 340 corresponds to an original HTML file and contains a linked Content file 355. The name of content subdirectory 340 is preferably derived from its identifier, as specified in the metadata. For example, the content subdirectory 340 for the main content file in an e-book version of "Alice in Wonderland" might be named "alice.htm." The Content file 355 contains an encoding of the original e-book material. The encoding format is designed to require minimal computational complexity for parsing. In addition to the Content file 355, there are additional streams contained in the Content 2 subdirectory 340 associated with the original e-book file, including for example, link-destination indexes 360 and 365. These indexes 360 and 365 are files that may be used to accelerate random access at run-time.

The root directory 305 also has a linked manifest file 325, which provides a list of all files that are part of the particular e-book publication. This information is typically derived from the metadata. Optionally, the root directory 305 also has a Digital Rights Management (DRM) directory 310 for the protection of the content of the publication. Particularly, if the publication is protected, the contents of the DRM directory 310 are then required for the reading device to generate any decryption keys necessary to access the actual data content of the publication.

In accordance with the present invention, the root directory 305 includes information that provides for faster run-time processing. These include link destination index files 360 and 365 and optionally index files 330. The link destination index files 360 and 365 provide location information for each of the links contained in the content files. Further details of the link destination index files 360 and 365 are disclosed in a related co-pending U.S. patent application Ser. No. 09/552,001. Index files 330 provide pagination of the e-book. Further details of the index files 330 are disclosed in a related co-pending U.S. patent application Ser. No. 09,552,230.

Figure 4:
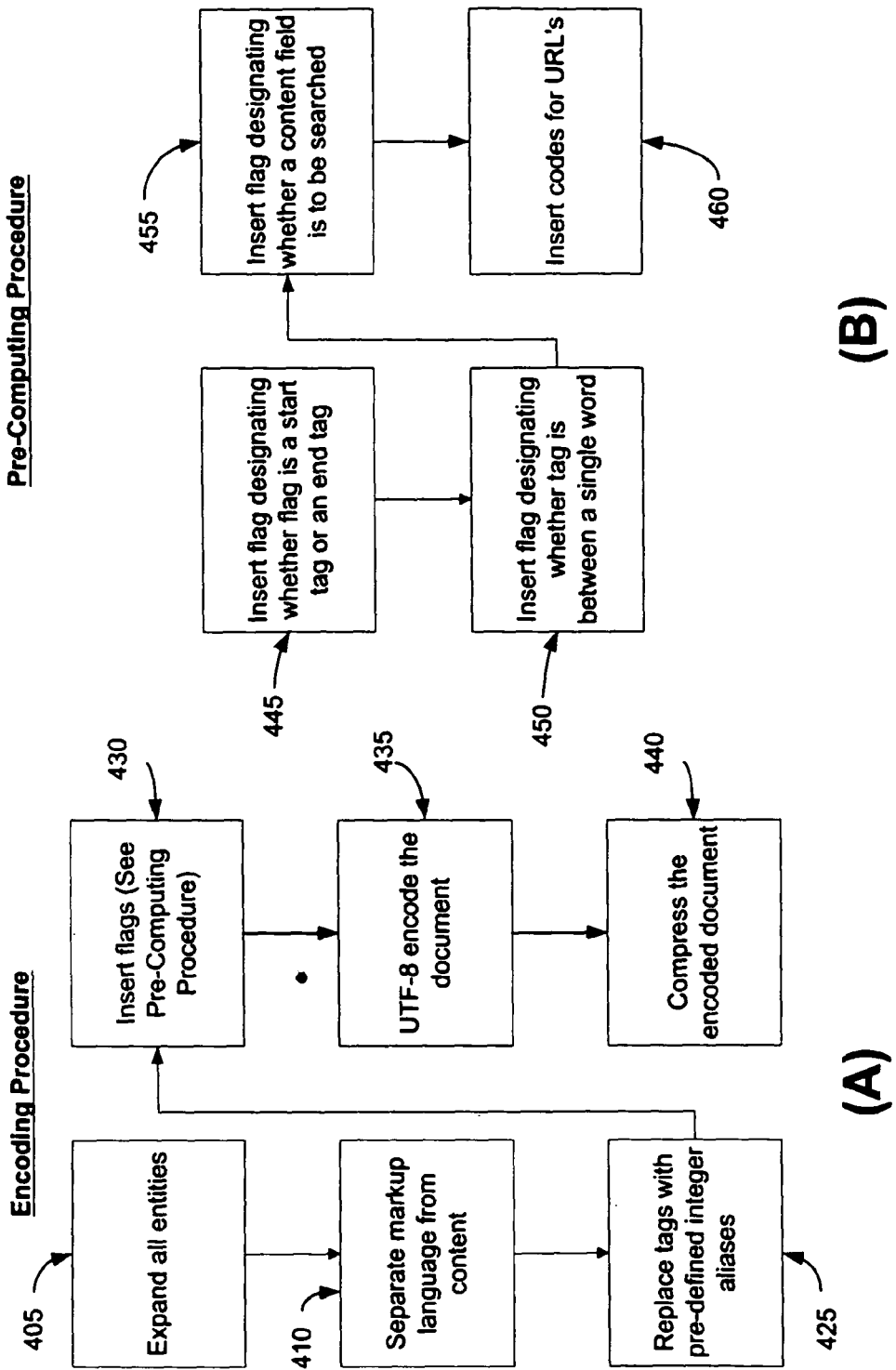
FIG. 4(A) is a flow chart depicting the process for encoding an e-book file in accordance with a preferred embodiment of the present invention.
FIG. 4(B) is a flow chart depicting the process for pre-computing an e-book file in accordance with a preferred embodiment of the present invention.

During the conversion process of the e-book file from the OEB file 220 to the nested hierarchy of files 240, the content information of the e-book is also pre-computed and encoded to accelerate run-time search operations and to minimize the computational requirements for run-time parsing, respectively. FIGS. 4(A) and 4(B) are flow charts illustrating the encoding and pre-computing procedure, respectively, in accordance with a preferred embodiment of the present invention.

Referring first to FIG. 4(A), the e-book file is encoded to improve run-time parsing and other run-time processes. Those skilled in the art will appreciate that the above encoding steps may be performed in any order and that some of the steps may be performed in parallel.

At step 405, before the encoding actually occurs, all entities are fully expanded from their source forms. Entities are escape sequences, typically used to represent characters that are difficult to represent directly in source documents.

At step 410, a code character is inserted to separate markup language from the actual content of the e-book file. For example, the code may be a Unicode character 0x0000. The Unicode character is inserted before and after each start and end tag. Subsequent encoding of the markup (discussed herein) should be constrained so that the Unicode character 0x0000 never occurs within the representation of a start or end-tag or elsewhere within the content, but rather occurs only as the first and last character of each start and end tag.

At step 425, the tags are replaced by a pre-defined integer code or alias representing the tags. Optionally at this step, attribute type information is also replaced by an integer code representing the attribute type. Tags are generally identifiers written between less than (<) and greater than (>) signs. Typically, an opening tag and a closing tag surround a piece of text. Attributes may also be placed within the tag, between the greater than and less than signs, to provided added functionality.

Tags are encoded as a pre-defined integer code that identifies that tag, or by a string containing the tag (if an integer code for the tag does not exist). In the latter case, a special code is used, as described below. Logically, integer tag code values are in the range from −32767 to 32766 when constrained to a 16-bit length. A 16-bit integer can actually encode two more values than included in this range. One value, −32768 or 0x8000 hex, is reserved to indicate that there is no known tag code, but that a string identifying the tag follows. Furthermore, for non-negative code values, the code value is incremented before it is written to the content stream. This encoding is used to prevent a zero character from occurring within the tag. The other value, 32767, is not used since the incrementing of the code value renders it impossible to encode this value. In one preferred embodiment, where the e-book has HTML content, the tag codes are TAGID values exposed in a header file MSHTML.H in Internet Explorer (IE) 5.0 web browser. For example, a <P> tag's corresponding code is TAGID_P, with value 73 in IE 5.0. In this embodiment, the value 73 is incremented to 74 before output to the content stream.

Similarly, attributes can be identified by integer codes. Any coding scheme may be implemented for the attribute types. In one preferred embodiment where the e-book has HTML content, the attribute codes may be taken from an IE 5.0 web browser header file, namely the header file MSHTMDID.H. HTML attribute codes are the DISPIDs (dispatch identifiers) exposed by the programming model for the IE 5.0 web browser. For example, the tag <p align="left">, has an attribute "align." This attribute is identified by code STDPROPID_XOBJ_BLOCKALIGN in the IE 5.0 web browser header file. The integer code value for the STDPROPID_XOBJ_BLOCKALIGN code is 0x80010048. The IE 5.0 web browser's attribute DISPIDs come from one of three ranges drawn from ActiveX Control specifications. Element-specific properties have simple positive DISPIDs. Other properties have either a "stock-property" range (namely, small negative numbers) or an X-Object property range (namely, unsigned 32-bit quantities starting at 0x80010000).

The attribute codes may use a different scheme for encoding code values than do tag codes. Like tag codes, the attribute code values from 0 to 32766 are encoded using pre-defined integer values from 1 to 32767, or 0x0001 to 0x7FFF hex. Also like tag codes, the special value −32768, or 0x8000 hex, is reserved to indicate that there is no known code value, and a length-prefixed string containing the attribute name follows. The other negative codes, however, represent either stock or X-Object DISPID values. Accordingly, stock-property DISPIDs in the range from −1024 to −2 are encoded as 16-bit Unicode WCHARs as by using the following conversion: wch=dispid+1025+0xFC00. For example, the code −1024 is represented by 0xFC01, and the code −2 is encoded as 0xFFFF. Note that −1 is defined to be DISPID_UNKNOWN, and can never be used as valid property DISPID. X-Object property DISPIDs in the range from 0x80010000 to 0x80017BFF are encoded as the 16-bit values 0x8001 to 0xFC00. After UTF-8 encoding (step 435 discussed herein), the attribute-code for the HTML "align" attribute is actually stored as three bytes, as would the attribute-code for any other stock or X-Object property.

Referring still to FIG. 4(A), at step 430, various flags are inserted in the tags (discussed further herein with respect to FIG. 4(B)) to improve run-time search operations. At this point, each start tag has the following physical representation:
(1) Leading 0x0000
(2) Single Unicode WCHAR of flags
(3) Tag identification
(4) <Attribute identification, Attribute Value>
(5) Trailing 0x0000

Lines (1) and (5) respectively are the leading and trailing codes to provide the boundary for the tag. Line (2) includes any flags that would help identify the content associated with the tag (e.g., WORDBREAK, NOSEARCH, STARTTAG, ENDTAG). Line (3) is the integer code identifying the tag, or the string for an unknown tag, as described above. Line (4) is an integer code identifying the attribute type along with an integer value for the corresponding attribute type, or the string for an unknown attribute as described above, for each attribute present on the tag. Similarly, each end tag has the following representation:
(1) Leading 0x0000
(2) Single Unicode WCHAR of flags
(3) Trailing 0x0000

As before, lines (1) and (3) provide the leading and trailing codes to provide the boundary for the tag and line (2) includes any flags that would help identify the content associated with the tag.

At step 435, UTF-8 encoding is applied to obtain a sequence of encoded bytes in accordance with the present invention. UTF-8 is essentially an encoding method that encodes common Unicode characters more compactly. Under UTF-8, Unicode characters are transformed into a variable length encoding of bytes. UTF-8 to has the advantages that the Unicode characters corresponding to the familiar ASCII set end up having the same byte values as ASCII, and that Unicode characters transformed into UTF-8 can be used with much existing software without extensive software rewrites. In another embodiment, step 435 is optional and may be avoided.

Finally, at step 440, the encoded material is compressed. As preferred, compression settings for the e-book file may be fixed when the e-book is generated. The reading software can transparently access content without regard to compression settings. The compression specification can be changed at any time without requiring any corresponding change to the reading software. Those skilled in the art will appreciate that any number of compression techniques may be used in accordance with the present invention.

Referring to FIG. 4(B), during the encoding process (step 430), flags may be inserted within the tags. These flags represent pre-computation results to improve run-time linear search operations. In particular, the e-book file may be pre-computed using knowledge of the tags within the e-book file as well as the CSS for the e-book file. Any or all of the pre-computing steps of FIG. 4(B) may be utilized and still be considered within the scope of the present invention. Furthermore, the pre-computation steps may be performed in any order and may also be performed in parallel.

One pre-computation technique is to analyze the tag to determine whether the tag is a start tag or an end tag (step 445). A position flag may then be inserted in the tag to specify whether the tag is a start tag or an end tag, again to improve run-time parsing and search operations. Accordingly, every tag will have encoded therein at least one flag, either STARTTAG or ENDTAG.

Another pre-computation technique is to analyze a tag between two terms to determine whether the tag separates a word (step 450). Any number of tags may be placed between words. Some tags between two terms are presumed to be word breaks, whereas others are not. For example, the term "Foo</P><P>bar" contains two words since the </P> and <P> tags serve to provide spaces between two paragraphs. On the other hand, the term "Foo<I>bar</I>" contains one word since the <I> and </I> tags merely serve to italicize the "bar" portion of the single word. The result is that the word may not be recognized at run-time when a search is done for the word. Alternatively, additional run-time processing may be required to determine whether the subject term is a single word or two words. In accordance with the pre-compute procedure, default semantics of the markup language are applied and some CSS settings are pre-cascaded to determine whether the tag is a word break. If the tag is determined to separate a word, a WORDBREAK flag is inserted within the tag. Accordingly, during run-time search procedures, the word may be readily searched without requiring additional run-time processing of the tags to determine whether the word is a single word.

Yet another pre-computation technique is to analyze tags designating content that is hidden and not displayed on the reading device (step 455). Such content may include, for example, comments and processing-instructions within the e-book file. Such content therefore need not be searched at run-time (for example, during linear search operations) and may be ignored. If a tag is determined to designate content that is not to be displayed, NOSEARCH flags are inserted around the subject content. The NOSEARCH flag indicates that the designated content is hidden and not displayed on the reading device, and therefore need not be searched at run-time.

Still another pre-computation technique is to analyze Uniform Resource Locator (URL) references within a file (step 460). The URL is pre-computed and encoded in one of the following manners. If the URL refers to the same file as that containing the URL reference, then the URL is replaced with a flag indicating that the URL is the same as the subject e-book file. If the URL references some other file referenced in the manifest file 325, then part of the URL is replaced with a different flag followed by the a reference string for the file in the manifest file 325 being referenced. If the URL references a file not included in the manifest file 325, then a different Unicode flag is prepended to the URL with the URL itself being unmodified. Any URL not recognized as such is not transformed in any way. Accordingly, run-time computations for determining the location of URLs within an e-book file may be minimized. For example, the flag values for the above-identified three conditions may be 0x0001, 0x0002, and 0x0003, respectively. Other encoding schemes may also be used.

These pre-computation rules are applied at file-generation time, rather than at run-time. Accordingly, these pre-computation techniques provide improved run time searching since various computations relating to the markup language tags have already been accomplished with the computation results inserted as flags or codes within the markup language document.

Advantageously, the pre-computing and encoding scheme serves to speed up run-time parsing (by separating tags from content), to speed up linear searching (by substituting compact values for tag and attribute names, inserting flags and URL encoding), and to reduce size of the e-book file (by UTF-8 encoding and compressing).

The following is an example of processing an HTML fragment in accordance with the pre-computing and encoding procedures described above. The HTML fragment to be encoded is <td nowrap><p align=center>Foo</td>. First, the content is expanded to well-formed content to become: <td nowrap="nowrap"><p align="center">Foo</p></td>. This HTML fragment contains two start tags (<td nowrap="nowrap"> and <p align="center">), a content portion (Foo), and two end tags (</p> and </td>).

Second, a code is inserted before and after each start and end tag. The tags are replaced by an integer code representing the tags, and various flags are inserted to improve run-time search operations. Logically, the encoded tag structure becomes:

| | |
|---|---|
| (1) | 0x0000 |
| (2) | Flags = STARTTAG | WORDBREAK = 0x000C |
| (3) | Tag code = TAGID__TD = 95 = 0x5f |
| (4) | Attribute code=DISPID__IHTMLTABLECELL__NOWRAP = 0x8001138D |
| (5) | Attribute value = Boolean TRUE |
| (6) | 0x0000 |
| (7) | 0x0000 |
| (8) | Flags = STARTTAG | WORDBREAK == 0x000C |
| (9) | Tag code = TAGID__P = 73 = 0x49 |
| (10) | Attribute code = STDPROPID__XOBJ__BLOCKALIGN = 0x80010048 |
| (11) | Atribute value = string "center" |
| (12) | 0x0000 |
| (13) | L'F' L'o' L'o' |
| (14) | 0x0000 |
| (15) | Flags = ENDTAG | WORDBREAK = 0x0014 |
| (16) | 0x0000 |
| (17) | 0x0000 |
| (18) | Flags = ENDTAG | WORDBREAK = 0x0014 |
| (19) | 0x0000 |

Lines 1-6 and 7-12, respectively, represent the two start tags and lines 14-16 and 17-19, respectively, represent the two end tags. Each start tag includes a leading and ending Unicode character 0x0000 to segregate the tag from other content (lines 1, 6, 7, and 12). Each start tag also includes two flags STARTTAG and WORDBREAK (lines 2 and 8). Similar flags are also included in the two end tags (lines 15 and 18). Each start tag also includes an integer representation of the tag (lines 3 and 9). Finally, each start tag includes an integer representation of the attribute type (lines 4 and 10) followed by the value for the attribute (lines 5 and 11). The content, represented by line 13, is thereby separated from the start and end tags and, thereby, can be readily identified at run-time.

Third, the above sequence is encoded into a sequence of Unicode characters:

0x0000
0x000C
0x0060
0x938E
0xffff 0x0002
0x0000
0x0000
0x000C
0x004A
0x8049
0x0007 L'c' L'e' L'n' L't' L'e' L'r'
0x0000
L'F' L'o' L'o'
0x0000
0x0014
0x0000
0x0000
0x0014
0x0000

Next, applying UTF-8 encoding to the above, the following sequence of bytes are achieved in accordance with the present invention:

0x00
0x0c
0x60
0xe9 0x8e 0x8e
0xef 0xbf 0xbf 0x02
0x00
0x00
0x0c
0x4a
0xe8 0x81 0x89
0x07 'c' 'e' 'n' 't' 'e' 'r'
0x00
'F' 'o' 'o'
0x00
0x14
0x00
0x00
0x14
0x00

Finally, the UTF-8 encoded expression is compressed using a compression agent. Advantageously, the present invention provides the ability to pre-compute and encode arbitrary markup language (such as HTML, CSS, and XML) to minimize computational requirements during run-time processing of the e-book content.

It will be apparent to those skilled in the art that application of the present invention need not merely be utilized in conjunction with a reading device. The present invention may be implemented for use with any markup language document including, but not limited to, HyperText Markup Language (HTML), eXtensible Markup Language (XML), Standard Generalized Markup Language (SGML), eXtensible HyperText Markup Language (XHTML), and Synchronized Multimedia Integration Language (SMIL). Further, the present invention may be implemented within any computing environment.

In the foregoing specification, the present invention has been described with reference to specific exemplary embodiments thereof. Although the invention has been described in terms of a preferred embodiment, those skilled in the art will recognize that various modifications, embodiments or variations of the invention can be practiced within the spirit and scope of the invention as set forth in the appended claims. All are considered within the sphere, spirit, and scope of the invention. The specification and drawings are, therefore, to be regarded in an illustrated rather than restrictive sense. Accordingly, it is not intended that the invention be limited except as may be necessary in view of the appended claims.

What is claimed is:

1. A method for encoding an electronic document having markup language content, wherein the document includes at least one tag and an associated content, the method comprising the steps of:
   (a) separating the tag from the content with a separation variable;
   (b) replacing the tag with an alias, wherein the alias is a pre-defined representation for the tag; and
   (c) inserting at least one flag within the tag to form an encode tag structure, wherein a first encoded document is formed.

2. The method for encoding of claim 1, wherein the step of replacing includes the step of replacing at least one attribute type within the tag with an attribute alias, wherein the attribute alias is a predefined representation for the attribute type.

3. The method for encoding of claim 1, further comprising the steps of:
   (d) UTF-8 encoding the first encoded document to form a second encoded document.

4. The method for encoding of claim 3, further comprising the step of:
   (e) compressing the second encoded document to form a compressed document.

5. The method for encoding of claim 1, wherein the step of inserting includes the step of inserting a position flag to indicate whether the tag is a start tag or an end tag.

6. The method for encoding of claim 1, wherein the step of inserting includes the step of inserting a word break flag between a left and right term of the associated content, whereby a word break may be readily identified during a run-time search operation.

7. The method for encoding of claim 1, wherein the step of inserting includes the step of inserting a no search flag in association with a portion of the content information, whereby a no search field may be readily identified and skipped during a run-time linear search.

8. The method for encoding of claim 1, further comprising the step of:
   (d) replacing a URL within the content information with a reference string, whereby the file referenced by the URL may be readily accessed when selected during run-time.

9. A computer-readable medium having computer-executable instructions for performing the steps recited in claim 1.

10. A method for pre-computing an electronic document having markup language content comprising the steps of:
    (a) identifying a tag within a document associated with a portion of content;
    (b) determining whether the portion is to be displayed for viewing by a reading device; and
    (c) if the portion is not to be displayed for viewing, inserting a no search flag in association with the portion, whereby a no search field may be readily identified and skipped during a run-time linear search.

11. A computer-readable medium having computer-executable instructions for performing the steps recited in claim 10.

12. A method for pre-computing an electronic document having markup language content comprising the steps of:
    (a) identifying a Uniform Resource Locator (URL) within a document;
    (b) searching a manifest file for a file referenced by the URL; and
    (c) if the file is identified in the manifest file with a reference string, replacing part of the URL with the reference string and a flag for the file,
    whereby the file referenced by the URL may be readily accessed when selected during run-time.

13. A computer-readable medium having computer-executable instructions for performing the steps recited in claim 12.

* * * * *